United States Patent [19]

Thring et al.

[11] 3,764,667
[45] Oct. 9, 1973

[54] PROCESS FOR PRODUCING PIGMENT-QUALITY TITANIUM DIOXIDE

[75] Inventors: Meredith Wooldrige Thring, Buckhurst Hill, England; Dante Cadorin; Aldo Ducato, both of Novara, Italy

[73] Assignee: Montecatini Edison S.p.A., Milan, Italy

[22] Filed: May 7, 1971

[21] Appl. No.: 141,266

[30] Foreign Application Priority Data
May 11, 1970  Italy .............................. 24406 A/70

[52] U.S. Cl. .................. 423/613, 423/659, 23/277
[51] Int. Cl. .......................................... C01g 23/04
[58] Field of Search ...................... 23/202 V, 1, 1 B, 23/139, 140; 423/613, 659, 612

[56] References Cited
UNITED STATES PATENTS

| | | |
|---|---|---|
| 2,779,662 | 1/1957 | Frey .................................. 23/202 V |
| 2,980,509 | 4/1961 | Frey .................................. 23/202 V |
| 3,355,253 | 11/1967 | Tillmann et al. ............... 23/202 V X |
| 3,360,341 | 12/1967 | Tillmann et al. ............... 23/202 V X |
| 3,365,274 | 1/1968 | Carpenter et al. ................. 23/202 V |
| 3,518,052 | 6/1970 | Foulds ............................. 23/202 V |

Primary Examiner—Edward Stern
Attorney—Stevens, Davis, Miller & Mosher

[57] ABSTRACT

An axial-type reactor for producing pigment-quality titanium dioxide is disclosed which comprises a reaction chamber and a plurality of spaced-apart concentric tubes which define a plurality of concentric passages for introducing at their exit end into the upstream end of the reaction chamber gaseous $TiCl_4$, $O_2$ and CO, and wherein the tubes which define the passage for $TiCl_4$ protrude into said reaction chamber a greater distance than the other tubes, thereby locating the exit end of said $TiCl_4$ passage downstream with respect to the exit ends of the other passages. The corresponding process is also disclosed.

2 Claims, 4 Drawing Figures

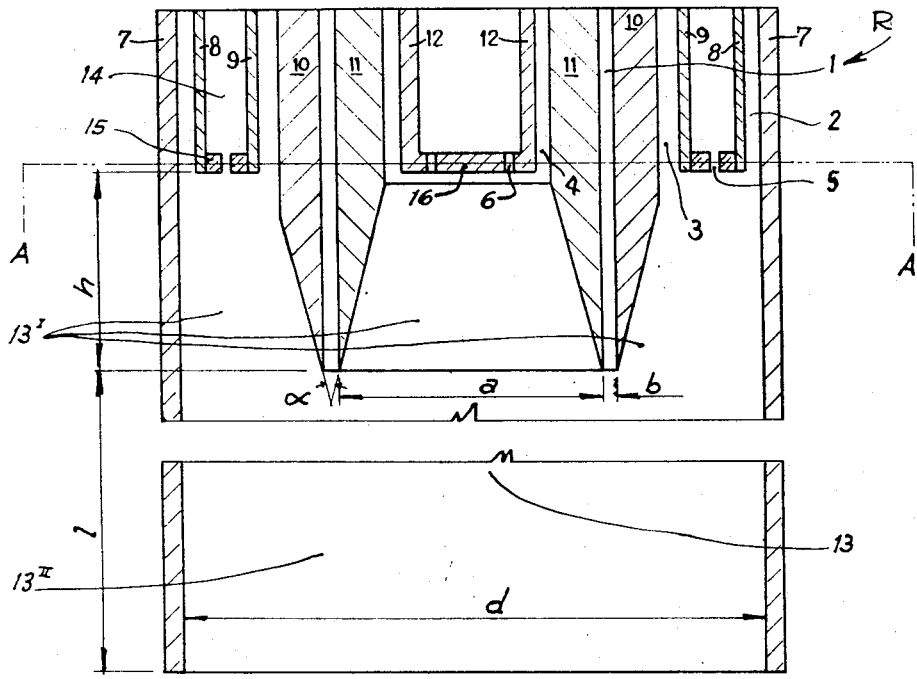
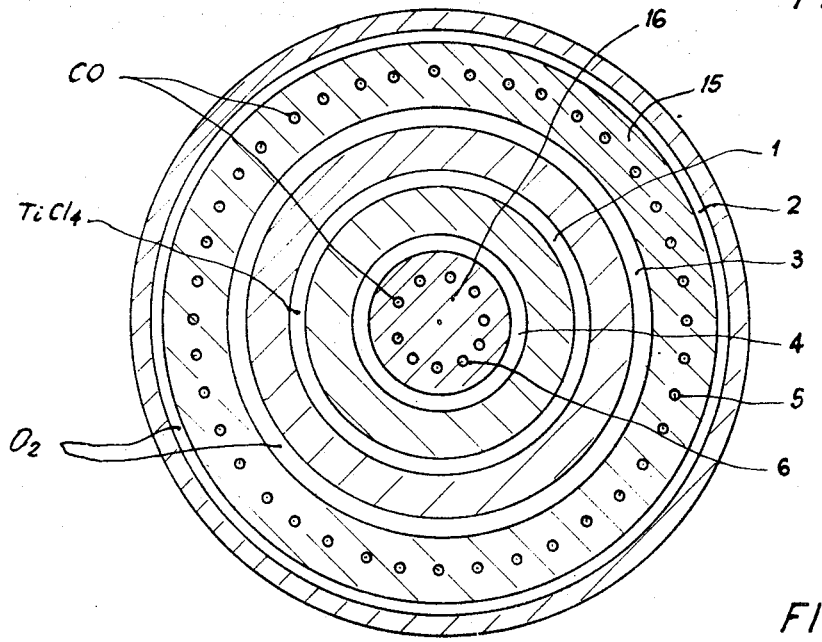

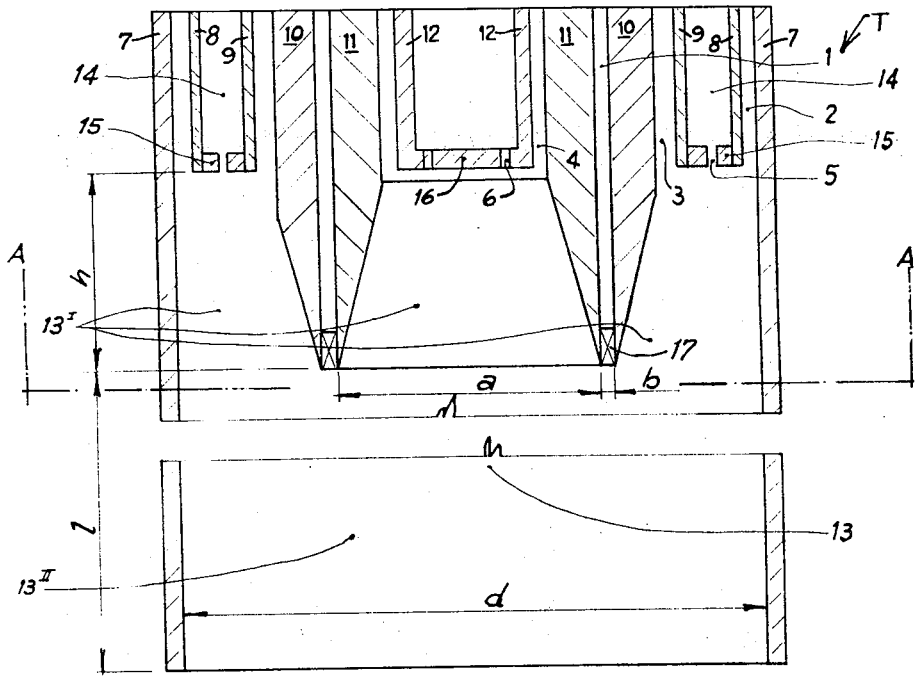
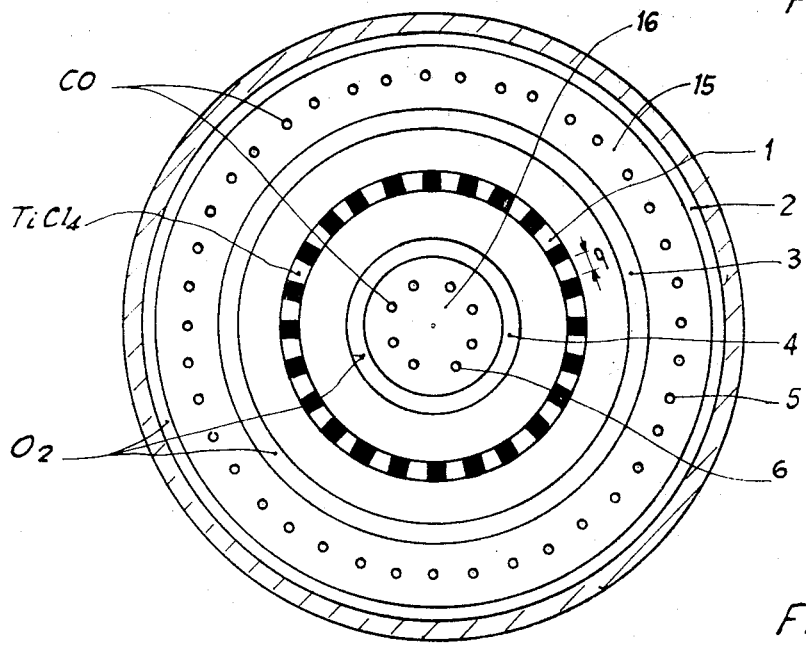

PROCESS FOR PRODUCING PIGMENT-QUALITY TITANIUM DIOXIDE

The present invention relates to an improved reactor and process for producing finely divided metal oxides. More particularly, the invention relates to a reactor and to a process for producing pigment-quality titanium dioxide, by reacting in gaseous phase a titanium halide with oxygen or with an oxygen-containing gas. Still more particularly, the present invention relates to an improved axial-type reactor for producing pigment-quality titanium dioxide and to the corresponding process.

As is well known, an axial-type reactor is a substantially cylindrical reactor in which the reagent streams are fed into the mixing and reaction zone while flowing in the same, and substantially parallel, directions with respect to the longitudinal axis of the reactor. It is well known that it is possible to obtain finely divided metal oxides by oxidizing metal halides in gaseous phase. Usually, the reaction temperature is higher than 900°C. More particularly, it is well known to produce pigment-quality titanium dioxide by reacting $TiCl_4$ with oxygen or with an oxygen-containing gas (usually air) in accordance with the following reaction:

$$TiCl_4 + O_2 \rightarrow TiO_2 + 2Cl_2$$

The chlorine thus obtained as a byproduct can be used to chlorinate the starting titanium-bearing material (e.g. rutile ore) for the overall process.

Furthermore, it is well known that the $TiCl_4$ and $O_2$ must be preheated up to suitable temperatures. The methods most widely used for that purpose are: indirect heating of the reactants up to about 800°–1000°C in suitable chambers lined with inert materials, such as for instance silica, amorphous carbon or graphite, before feeding them in the reactor; or direct heating by means of an auxiliary flame obtained by burning a mixture of carbon monoxide (or some other fuel) and oxygen.

Axial-type reactors for producing pigment-quality titanium dioxide have been broadly known for a long time. Such reactors usually comprise a reaction chamber and a plurality of co-axial, generally cylindrical, spaced-apart tubes which define a plurality of annular co-axial passages, through which and from which the various gaseous reactants are fed into the reaction chamber. For instance, an axial reactor has been recently disclosed in which the downstream ends of various tubes, i.e., those ends which terminate in the reaction chamber, are coplanar. The reactants are separately fed according to the following order from the central innermost passage to the annular outermost one: oxygen, carbon monoxide, titanium tetrachloride, carbon monoxide and oxygen. Such an arrangement of reactants has the purpose of avoiding an untimely or premature reaction between the titanium tetrachloride and the oxygen in the immediate neighborhood of the downstream ends of the tubes, which would cause the deposition thereon of solid reaction products. Such deposits might in turn stop the smooth running and even eventually lead to the complete plugging of the reactor.

In order to minimize the occurrence of such deposits, it has been suggested to interpose a stream of an inert gas, e.g., nitrogen, between the concentric streams of titanium tetrachloride and carbon monoxide. However, the use of inert gases presents certain drawbacks. For instance, as has been mentioned before, the chlorine produced in the $TiCl_4$-oxidization step is used in the step of chlorinating the starting titanium-bearing material in order to obtain additional $TiCl_4$. The addition of an inert gas therefore leads to the dilution of the by-product chlorine thus obtained. This is obviously an undesirable result, since it then becomes necessary to provide larger equipment than would be required if it were possible to obtain and utilize undiluted chlorine.

Furthermore, in none of the axial reactors and related processes disclosed so far, which utilize an auxiliary flame for heating the reactants, has it been possible to avoid that the oxidation reaction of $TiCl_4$ takes place in a carbon monoxide-free environment. The presence of unburnt carbon monoxide during the reaction between titanium tetrachloride and oxygen causes many drawbacks. For instance, it is well known that $TiCl_4$ is a strong combustion inhibitor and therefore the carbon monoxide which is present in the zone of mixing the $TiCl_4$ with $O_2$ cannot be thoroughly burnt. Therefore a lower mixing temperature and a slower starting of the oxidation reaction are obtained. Furthermore, carbon monoxide promotes the re-chlorination of $TiO_2$ particles, thus causing a decrease in the reaction yield and the obtaining of a $TiO_2$ product consisting of particles much too uneven in size.

In accordance with the present invention, an improved process has been discovered for producing an excellent pigment-quality titanium dioxide while overcoming the drawbacks of the prior art processes. Furthermore, an improved axial-flow reactor for carrying out the process has been devised as a part of the invention.

Thus, in accordance with this invention the process for producing pigment-quality titanium dioxide by reacting titanium tetrachloride with oxygen in the presence of an auxiliary flame obtained by the combustion of a carbonaceous gaseous fuel (e.g. carbon monoxide) into carbon dioxide, substantially comprises feeding gaseous co-axial and separate streams of titanium tetrachloride, oxygen and gaseous fuel into a reaction zone and is characterized in that the titaniun tetrachloride stream is fed into that part of the reaction zone in which only oxygen and carbon dioxide are present which carbon dioxide results from the previously-completed combustion of the carbonaceous fuel.

In accordance with one of the main features of the invention, the gaseous titanium tetrachloride stream is introduced into the reaction zone in the form of a substantially annular stream. Such a stream is surrounded both outwardly and inwardly by two streams consisting essentially of a mixture of oxygen and carbon dioxide.

The improved axial-type reactor by means of which the process is carried out, and which embodies other features of the invention, comprises a reaction chamber and a plurality of concentric spaced-apart tubes which define a plurality of concentric passages for introducing at their exit ends into the reaction chamber the titanium tetrachloride, the oxygen and the gaseous carbonaceous fuel.

More particularly, the reactor is characterized in that the tubes which define the $TiCl_4$-passage protrude into the reaction chamber a greater distance than the other tubes, whereby the exit end of said $TiCl_4$-passage is located downstream with respect to the exit ends of the other passages.

In accordance with a preferred embodiment, said concentric tubes are cylindrical and define a plurality of annular peripheral passages plus a central cylindrical passage.

The process and reactor of the present invention will be illustrated as to further details by reference to the accompanying drawings in which:

FIG. 1 is a longitudinal sectional view of a reactor constructed in accordance with the present invention.

FIG. 2 is a sectional view taken along line A-A of FIG. 1.

FIG. 3 is a longitudinal sectional view of another reactor constructed in accordance with this invention.

FIG. 4 is a sectional view taken along line A-A of FIG. 3.

Referring now to the drawings, and particularly to FIGS. 1 and 2, reactor R comprises cylindrical and co-axial tubes 7, 8, 9, 10, 11 and 12 which are numbered from the outermost to the innermost one. These tubes define a plurality of co-axial passages suitable for introducing various reactants into the reaction chamber 13, having diameter $d$.

Reaction chamber 13 comprises a CO-combustion chamber 13' and a $TiCl_4$-reaction chamber 13'', the latter extending downwardly from the exit ends of tubes 10 and 11. $TiCl_4$-reaction chamber, 13'', has a length, $l$, which is preferably between about five and 15 times the diameter $d$. The overall length of reaction chamber 13 (namely 13' + 13'') is generally between about 5.3 and 15.6 times the diameter d of the reaction chamber.

In accordance with the most characteristic feature of this invention, tubes 10 and 11 which define passage 1 for introducing $TiCl_4$ into the reaction chamber 13, protrude into the reaction chamber so that their exit ends extend below the exit ends of tubes 8, 9 and 12 for a distance, 4, which is generally between about 0.3 and 0.6 times the diameter d of the reaction chamber.

The thickness, $b$, of passage 1 is preferably between about 0.01 and 0.1 times the diameter $d$.

Diameter, $a$, of tube 11 (i.e. the innermost of the tubes which define the $TiCl_4$-passage) is preferably between about 0.4 and 0.6 times the diameter d of reaction chamber 13.

In order to avoid the occurrence of vortices, tubes 10 and 11 are preferably tapered at their exit ends. The overall taper angle, $\alpha$, is generally between about 4° and 20°.

The $TiCl_4$ is usually preheated up to a temperature of about 400° – 500°C before being fed to the reactor. The feed velocity of the $TiCl_4$ is between about 20 and 120 m/s (meters per second).

The inner wall of tube 7 and the outer wall of tube 8 define passage 2 in which an oxygen stream, generally preheated up to about 750° – 800°C, is fed. The feed velocity of the oxygen is between about 10 and 40 m/s.

The inner wall of tube 8 and the outer wall of tube 9 define passage 14 in which a CO-stream, generally preheated up to about 380° – 420°C, is fed.

The inner wall of tube 9 and the outer wall of tube 10 define passage 3 in which an $O_2$-stream, preheated at the same temperature as that flowing along passage 2, is fed. The feed velocity of the oxygen is between about 10 and 40 m/s.

The inner wall of tube 11 and the outer wall of tube 12 define passage 4 in which an oxygen stream, preheated to the same temperature as the oxygen flowing along passages 2 and 3, is fed. The feed velocity of the oxygen is between about 10 and 40 m/s.

Carbon monoxide, preheated to the same temperature as that flowing along passage 14, is fed into the central tube 12. The feed velocity of the CO into the CO-combustion chamber, 13', is between about 40 and 90 m/s.

The inner walls of the outermost tube 7 extending downwardly from the ends of tubes 10 and 11 define the $TiCl_4$-reaction chamber, 13''.

In accordance with a preferred embodiment of this invention, tubes 8 and 9 are joined at their exit ends by means of an apertured metal annulus 15, as clearly shown in FIG. 1. Holes 5 made in the metal annulus 15 cause the carbon monoxide to flow from passage 14 to the CO-combustion chamber below, 13', in the form of thin separate streams. Preferably, the holes 5 are located along a circumference of the center line of the metal annulus 15. Still in accordance with this preferred embodiment of the invention, the central tube 12 which defines the cylindrical central passage has at its exit end an apertured diaphragm 16 for causing the CO to flow into the combustion chamber 13' in the form of thin separate streams. The feed velocity of the CO into the combustion chamber 13' is between about 40 and 90 m/s. Preferably, holes 6 of the diaphragm 16 are located along a circumference which is concentric with respect to the axis of tube 12 — see FIG. 2.

The purpose of having the CO-feed subdivided into a plurality of thin gaseous streams which is surrounded both inwardly and outwardly by two annular oxygen streams that are both co-axial with respect to the reactor is that, in this way, the CO-combustion reaction is highly stabilized. Furthermore, the auxiliary flame is steadily "anchored" to the burner.

Referring now to FIGS. 3 and 4, the reactor T — which is a modification of the reactor R shown in FIGS. 1 and 2 — comprises the same structural elements 1 through 16, the difference here being that the contiguous tubes 10 and 11 which define the annular $TiCl_4$-passage are joined at their exit ends by means of an apertured metal annulus 17, for causing the $TiCl_4$ to flow into the reaction chamber in the form of thin separate streams. For instance, there may be from 10 to 40 rectangular holes constituting the apertures in the annulus 17 and having dimensions $b$ and $q$, $q$ being preferably between about one and three times $b$. In this arrangement the feed velocity of the $TiCl_4$ is preferably between about 50 and 120 m/s. In any event, the velocity of the reaction mixture inside the reaction chamber 13 is between about 30 and 90 m/s.

Although in accordance with the foregoing preferred embodiments of the reactor of this invention the exit ends of tubes 8, 9 and 12 are coplanar, modified embodiments in which said exit ends are not coplanar are also regarded as being within the scope of this invention. However, in such case, the various distances $h$, $h_1, h_2$ etc. of the exit ends of the tubes which define the $TiCl_4$-passage and the exit ends of other passages must still be within the above-mentioned range, that is between about 0.3 and 0.6 times the diameter d of the reaction chamber 13.

The axial-flow reactors made in accordance with this invention are built from high temperature-and-corrosion-resistant alloys. For instance, one may advantageously employ inox steels 16–25–6 (Cr-Ni-Mo), cobalt alloys such as Haynes, and nickel alloys such as Nimonic, Inconel and Hastelloy. The walls of the reactors (both in the combustion and the reaction zones) are cooled, for instance with pressurized water or with high-boiling diathermic oils or other well known cooling agents, for maintaining the walls at temperatures varying between 300° and 500°C.

The titanium dioxide obtained by means of the reactor and process of the present invention is endowed with excellent pigment characteristics. It is substantially all made up of the rutile form of titanium dioxide and has a narrow distribution of particle dimensions. The average particle size is from about 0.18 to 0.25 microns. The percent number coefficient of variation ranges between about 25 percent and 40 percent.

The measure of the average particle size employed herein is the "arithmetic mean", $\bar{d}_{10}$, which is defined as follows:

$$\bar{d}_{10} = (1/n) \Sigma\, d_i f_i$$

wherein:

$n$ is the total number of particles measured (in the experimental data, $n = 2,000$);

$d_i$ is the diameter of a given particle; and $f_i$ is the frequency, i.e. the number of particles having diameter $d_i$.

This arithmetic mean is defined, for instance, in "Particle size - Theory and Industrial Applications" By Richard D. Cadle, Reinhold Publishing Co., New York 1965, the relevant part of which is incorporated herein by reference.

As a measure of the particle size distribution herein is meant the "percent number coefficient of variation". By "percent number coefficient of variation" (hereinbelow simply referred to as $v$) is meant the following percent ratio:

$$v = (s/\bar{d}_{10}) \times 100$$

wherein:

$s$ is the standard deviation of a distribution, equal to the square root of the variance.

(The variance of a distribution is equal to the mean of the squares of the deviations from the mean).

As is well known, the standard deviation is a measure of the average spread of the distribution.

$\bar{d}_{10}$ is the above-mentioned arithmetic mean.

This "percent number coefficient of variation" is defined, for instance, in "Statistical methods in research and production with special reference to the chemical industry" by Owen L. Davies, Oliver and Boyd, London 1963, the relevant part of which is incorporated herein by reference.

The pigment obtained in accordance with the present invention furthermore shows an excellent decoloration power. The values of tinting strength were determined by the New Jersey Zinc method described in the book by H.A. Gardner and G.G. Sward, "Paints, Varnishes, Lacquers and Colors," Gardner Lab. Inc., Bethesda, Maryland, U.S.A. (Page 52, 12th Edition, March 1962). Regular tinting strength is measured using one gram of $TiO_2$. One gram of $TiO_2$ is mixed with 0.82 grams of castor oil and with a determined amount of black pigment (made up of one part by weight of black powder and seven parts by weight of calcium carbonate): the homogenized sample thus obtained is compared with a standard sample. The amount of black pigment needed in order to obtain the equivalence between the tested sample and the standard sample, gives the measure of the tinting strength. The test called "dilute tinting strength" is carried out in a similar manner, while starting with a mixture of 0.15 grams of $TiO_2$ and 0.85 grams of calcium carbonate. The difference between the regular tinting strength and the dilute tinting strength, and the tone of the grey mixture gives information on the pigment grain.

The following detailed working examples are given still further to illustrate the present invention.

EXAMPLE 1

The reactor shown in FIGS. 1 and 2 was employed. Its characteristics were as follows (the values given are in millimeters): $d = 61$; $l = 800$; $a = 32$; $h = 27$; $b = 2$.

A total of 25 $Nm^3/h$ of oxygen preheated to 750°C were fed to the reactor via passages 2, 3 and 4. A total of 12 $Nm^3/h$ of carbon monoxide preheated to 400°C were fed to the reactor via passage 14 and the tube 12.

After the CO-combustion reaction had been started and had reached thermal equilibrium, 138 kg/h of $TiCl_4$ preheated to 500°C (and containing 1 percent by weight of $AlCl_3$ as rutilizing agent) were fed into the reactor.

The reaction temperature was 1530 ± 20°C. After a 10-hour run, 550 Kg of pigment-quality $TiO_2$ (rutile) were obtained. The average particle size was 0.21 microns. The percent number coefficient of variation was 35 percent. The Regular Tinting Strength (hereinbelow simply referred to as RTS) was 1620 blue tone 1. The Dilute Tinting Strength value (hereinbelow simply referred to as DTS) was 1730 blue tone 2.

EXAMPLE 2

The same type of reactor was used as in Example 1. The relevant characteristics were the same as in Example 1, except that here $h$ was decreased to 10 millimeters instead of 27. Under such conditions, the combustion reaction of the CO was not completed before the burnt gases became mixed with the $TiCl_4$. The CO combustion yield was detected by withdrawing some samples of burnt gases by means of cooled probes. Such withdrawals were effected near the $TiCl_4$ exit slot, before feeding in the $TiCl_4$.

A total of 30.5 $Nm^3/h$ of oxygen preheated to 750°C and a total of 15 $Nm^3/h$ of CO preheated to 400°C were fed into the reactor, under the same conditions as in Example 1. After starting the CO-combustion reaction and reaching thermal equilibrium, 173 Kg/h of $TiCl_4$ preheated to 500°C and containing 1 percent by weight of $AlCl_3$ were fed into the reactor.

The reaction temperature was 1540 ± 20°C. After a 15-hour run, 1050 Kg of pigment-quality titanium dioxide (rutile) were obtained. The average particle size was 0.17 microns. The percent number coefficient of variation was 40 percent. The RTS value was 1530 blue tone 2. The DTS value was 1580 blue tone 2.

EXAMPLE 3

The reactor shown in FIGS. 3 and 4 was employed. The relevant characteristics were as follows (the values given are in millimeters): $d = 61$; $l = 800$; $a = 32$; $h = 27$; $b = 2$; $q = 2.5$; number of $TiCl_4$ jets = 25.

A total of 17 $Nm^3/h$ of oxygen preheated to 750°C were fed to the reactor via the passages 2, 3 and 4. A total of 7.5 $Nm^3/h$ of carbon monoxide preheated to 400°C were fed to the reactor via the tube 12 and the passage 14.

After starting the CO-combustion reaction and reaching thermal equilibrium, 87 Kg/h of $TiCl_4$, preheated to 500°C and containing 1 percent by weight of AlCl$_3$, were fed into the reactor.

The reaction temperature was 1500 ± 20°C. After an 18-hour run, 640 Kg of pigment-quality TiO$_2$ (rutile) were collected. The average particle size was 0.18 microns. The percent number coefficient of variation was 40 percent. RTS value was 1580 blue tone 2; DTS value was 1640 blue tone 2.

The main features of the present invention and the advantages thereof may be summarized as follows:

a. The TiCl$_4$-stream is fed into a zone of the reaction chamber wherein no appreciable amounts of unburnt carbon monoxide exist; in fact the TiCl$_4$-stream from the annular feed slot is surrounded, both inwardly and outwardly, by a mixture of excess oxygen and the carbon dioxide produced from the substantially complete combustion of CO. Consequently the drawbacks mentioned earlier are completely avoided.

b. By keeping steady the TiCl$_4$ feed rate and the thickness of the TiCl$_4$ annular slot, it is possible to scale up or down the reactor within wide limits without affecting the mixing time of the gaseous streams or the pigment characteristics.

c. The reactor in accordance with this invention is a piston-flow-type of reactor, i.e. without any recirculation. Therefore, the TiO$_2$-particles obtained thereby have substantially the same "history". This obviously makes it easier to obtain a uniform product endowed with a very high dimensional evenness.

d. It is possible readily to change the TiO$_2$-particles dimensions, simply by varying the thickness of the TiCl$_4$ annular slot.

Many modifications and variations may, of course, be made without departing from the spirit and scope of the invention.

What is claimed is:

1. A process for producing pigment-quality titanium dioxide by reacting TiCl$_4$ and O$_2$, at about 1480°–1560°C, by means of an auxiliary flame obtained by complete combustion of CO to CO$_2$, wherein coaxial and separate streams of gaseous TiCl$_4$, O$_2$ and CO are fed into a reactor comprising a reaction chamber and a plurality of concentric spaced-apart tubes which define a plurality of annular concentric passages plus a central passage for feeding said reactants at their exit ends into the upstream end of said reaction chamber, characterized in that:

a. the TiCl$_4$, the oxygen, and the carbon monoxide are respectively preheated to about 400°–500°C, to about 750°–800°C, and to about 380°–420°C;

b. the various gaseous reactants are fed according to the following order from the central passage to the outermost annular passage: carbon monoxide, oxygen, titanium tetrachloride, oxygen, carbon monoxide, oxygen; and c. the TiCl$_4$ is fed into its corresponding passage, said passage protruding downwardly from other passages for feeding the other reactants by a distance which is between about 0.3 and 0.6 times the diameter of the reaction chamber, for introducing said TiCl$_4$ into that zone of the reaction chamber wherein only oxygen and carbon dioxide are present.

2. The process of claim 1, wherein the feed velocities of the various reactants from the corresponding passages are as follows:

the oxygen feed velocity is between about 10 and 40 m/s; the carbon monoxide feed velocity is between about 40 and 90 m/s; and the titanium tetrachloride feed velocity is between about 20 and 120 m/s.

* * * * *